United States Patent [19]
Edmans et al.

[11] Patent Number: 5,874,675
[45] Date of Patent: Feb. 23, 1999

[54] WIDEBAND VIBRATION SENSOR

[75] Inventors: Daniel M. Edmans, Rensselaer; Adolfo Gutierrez, Troy; Christopher Cormeau, Albany; Edward Maby, Troy, all of N.Y.

[73] Assignee: InterScience, Inc., Troy, N.Y.

[21] Appl. No.: 821,042

[22] Filed: Mar. 20, 1997

[51] Int. Cl.⁶ .................................................. G01P 15/13
[52] U.S. Cl. .......................................... 73/514.21; 73/654
[58] Field of Search ........................... 73/514.01, 514.16, 73/514.17, 514.18, 514.21, 514.29, 514.36, DIG. 1, 654, 649

[56] References Cited

U.S. PATENT DOCUMENTS

| | | | |
|---|---|---|---|
| 3,413,573 | 11/1968 | Nathanson et al. | 332/178 |
| 3,585,466 | 6/1971 | Davis, Jr. | 257/254 |
| 4,483,194 | 11/1984 | Rudolf | 73/517 R |
| 4,841,775 | 6/1989 | Ikeda et al. | |
| 4,873,871 | 10/1989 | Bai et al. | |
| 5,001,933 | 3/1991 | Brand | |
| 5,095,752 | 3/1992 | Suzuki et al. | |
| 5,103,279 | 4/1992 | Gutteridge | |
| 5,205,171 | 4/1993 | O'Brien et al. | |
| 5,293,095 | 3/1994 | Tamara et al. | 310/338 |
| 5,345,824 | 9/1994 | Sherman et al. | |
| 5,417,312 | 5/1995 | Tsuchitani et al. | |
| 5,456,111 | 10/1995 | Hulsing | |
| 5,540,095 | 7/1996 | Sherman et al. | |

OTHER PUBLICATIONS

Harvey C. Nathanson, William E. Newell, Robert A. Wickstrom, & John R. Davis, Jr., "The Resonant Gate Transistor", IEEE Transactions on Electron Devices, Mar. 1967, pp. 117–133, vol. ED–14, No. 3.

M.J. Usher, I.W. Buckner, & R.F. Burch, "A Miniature Wideband horizontal–component feedback seismometer", Journal of Physics E. Scienific Instruments, 1977, pp. 1253–1260, vol. 10, Great Britian.

Kevin E. Burcham, Gregory N. DeBrabander, & Joseph T. Boyd, "Micromachined Silicon Cantilever Beam Accelerometer Incorporating and Integrated Optical Waveguide", Proc. of Int. Optics and Microstructures, 1992, pp. 12–18, SPIE vol. 1793.

Takashi Yoshida, Takahiro Kudo, Satoshi Kato, Shun–Ichi Miyazaki, Shinjiro Kiyono, & Kyoichi Ikeda, "Strain Sensitive Resonant Gate Transistor", IEEE Proceedings of MEMS95, Amsterdam, 1995, pp. 316–321.

Shun–Cihi Miyazaki, Takashi Yoshida, & Kyoichi Ikeda, "Strain Sensitive Resonant Gate Transistor", Proceedings of Micromachined Devices and Components II, SPIE vol. 2882, 1996, pp. 278–285.

Adolfo Guiterrez, Daniel Edmans, Chris Cormeau, Gernot Seidler, Dave Deangelis, & Edward Maby, Silicon Micromachined Sensor for Broadband Vibration Analysis Proc. of Int'l Conf. on Int. Micro/Nanotechnology for space appl., 1995, Houston, TX.

E.W. Maby, C.M. Cormeau, D.M. Edmans, & J.G. Fiorenza, "Micro–microphones for Insect Detection", Proceedings of the Second Symposium on Agroacoustics, National Center for Physical Acoustics, University of Mississippi, May 1996, pp. 1–8.

E.W. Maby, C.M. Cormeau, D.M. Edmans, J.G. Fiorenza, Micro–microphones for Insect Detection, Abstracts, 2nd Symposium on Agroacoustics, National Center for Physical Acoustics, University of Mississippi, Sep. 1995.

Primary Examiner—Hezron Williams
Assistant Examiner—Rose M. Miller
Attorney, Agent, or Firm—Jay R. Yablon

[57] ABSTRACT

This invention relates to an apparatus for making highly sensitive measurements of acceleration. The vibration sensor includes the use of a movable gate field effect transistor to sense the motion of a cantilever beam with respect to its base, it also includes an actuator element formed by a pair of electrodes actuating electrostatically on the beam. A feedback control loop is also included for force balance operation resulting in a very wide dynamic range for the sensor.

34 Claims, 2 Drawing Sheets

WIDEBAND VIBRATION SENSOR

FIELD OF THE INVENTION

This invention relates to the field of accelerometers, and particularly to enhancing the high frequency capabilities of accelerometers.

BACKGROUND OF THE INVENTION

The concept of a movable gate Field Effect Transistor (FET) has been extensively studied and reported in literature. A number of devices have been disclosed that make use of a movable gate FET for building accelerometers.

Force balance feedback control of vibration sensors has been used in seismometers and in accelerometers for attaining increased bandwidth and dynamic range. A number of devices using this approach have been routinely demonstrated and its theory of operation is well understood. Several seismometer and accelerometer manufacturers base their designs on this principle. The fabrication of a silicon accelerometer using wafer bonding techniques is disclosed in great detail in U.S. Pat. No. 5,095,752 and U.S. Pat. No. 5,417,312. In these invention disclosures a relatively large mass made of silicon is encapsulated in a cavity formed by electrodes made out of glass on silicon. The accelerometer is operated using an active feedback loop, in which control voltages are applied to the upper and lower electrodes. The displacement of the free mass under acceleration requires compensation through changes in the voltage applied between the upper and lower electrodes and the moving mass.

Utilizing the FET concept, the feedback bulk silicon micromachined accelerometer disclosed in U.S. Pat. No. 5,205,171 makes use of a feedback loop and at least one pair of dual electrodes acting as capacitive transducers. Differential sensing of the beam-gate capacitance variations is used to generate a null feedback signal used to modulate the voltage applied to electrodes in order to prevent them from moving. Based on the similar concept of using a FET, a device with acceleration dependent gain is disclosed in U.S. Pat. No. 5,103,279 and a device that uses a piezoelectric device to generate voltage for the gate is disclosed in U.S. Pat. No. 4,873,871.

The type of accelerometers mentioned above have good sensitivity at low frequencies but limited sensitivity at high frequencies, although they result in higher bandwidth devices than open loop devices.

OBJECTS OF THE INVENTION

It is an object of the invention disclosed herein to provide an accelerometer featuring a force balanced feedback loop in which the electrodes are used as actuating elements in the control loop and the sensing element utilizes a FET having a movable gate. This approach enables increased sensitivity and greater maximum signal range resulting in an increased bandwidth and dynamic range typical of a force balance system. Furthermore, the disclosed accelerometer is compatible with microelectromechanical systems processing.

SUMMARY OF THE INVENTION

The present invention provides a high sensitivity wideband MEMS (Microelectromechanical Systems) acceleration sensor of the force balanced type based on the use of a closed feedback loop for attaining maximum bandwidth for the sensed variables. The vibration sensor operates through the action of forces applied electrostatically between a pair of fixed electrodes and the suspended mass configured to form a closed feedback loop. The most useful form of control is negative feedback which is intended to keep the mass in a nearly fixed position with respect to the electrodes and substrate, making the suspension appear more stiff and increasing the natural frequency.

The operation of the wideband vibration sensor is based on a feedback loop which includes a movable gate FET otherwise known as a MGT (Movable Gate Transistor) as the sensor element. The MGT offers the best means for detecting out-of-plane oscillations in a very small area, since it relies on capacitance per unit area (as opposed to total capacitance).

BRIEF DESCRIPTION OF THE DRAWING

The features of the invention believed to be novel are set forth in the appended claims. The invention, however, together with further objects and advantages thereof, may be best understood by references to the following description taken in conjunction with the accompanying drawing in which:

DETAILED DESCRIPTION OF INVENTION

Figure 1:
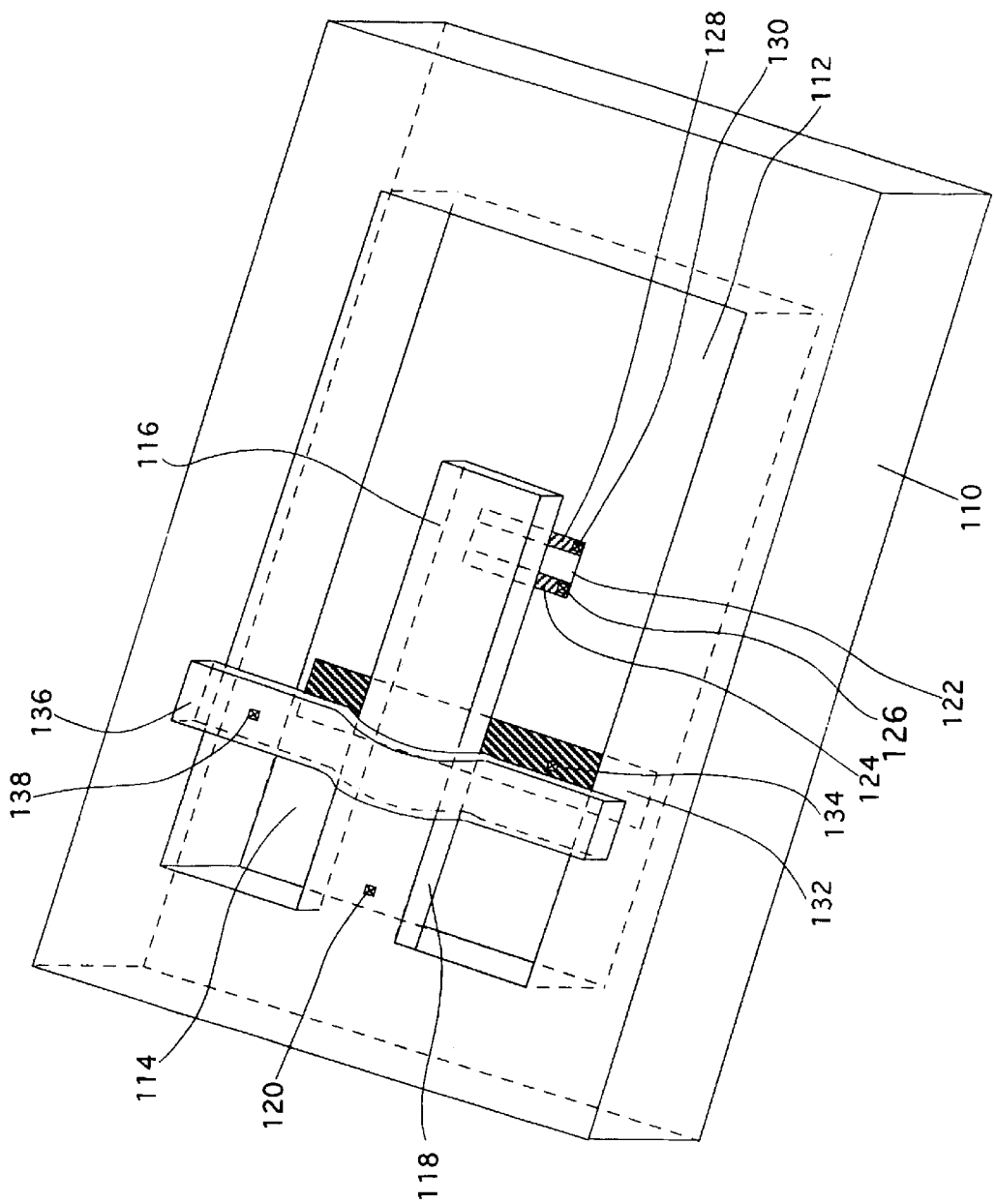
FIG. 1 is an isometric view of the preferred embodiment of the wideband vibration sensor invention. The figure shows the primary components of the sensor, the electrode pair (upper and lower feedback electrodes) and the MGT.

A preferred embodiment of the present invention is depicted in FIG. 1. Referring to FIG. 1, a base 110 appears with a cavity 112 and a cavity floor 114 in the central region of the base 110. A cantilever beam 118, thinner than the depth of the cavity, projects horizontally from the top surface of one end of the base 110, partially extending over the central cavity 112. An electrically-conductive cantilever beam contact pad 120 is positioned on the top surface of the cantilever beam 118. A gate region 116, is defined as the free end of the cantilever beam 118 immediately above a channel 122, i.e., as that region of the cantilever beam 118 that is sufficiently proximate to said channel 122 so as to electromagnetically interact with said channel 122 in a substantial manner. A means of external power is connected to the cantilever beam contact pad 120 in order to deliver specified voltages to the gate region 116 of the cantilever beam 118, as subsequently described.

On the cavity floor 114, beneath the gate region 116 of the cantilever beam 118, is the channel 122. Extending from one side of the channel 122, perpendicular to the direction of the cantilever beam 118, is a source implant 124. An electrically-conductive source implant contact pad 126 is located on the source implant 124. Extending from the opposite side of the channel 122, is a drain implant 128. An electrically-conductive drain implant contact pad 130 is located on the drain implant 128. A means of external power is connected to the source implant contact pad 126 in order to supply current to the source implant 124. Similarly, a means of sensing current flow is connected to the drain implant contact pad 130 in order to sense the modulated current flow output from the drain implant 128.

A lower feedback electrode 132 is superficially buried in the cavity floor 114 beneath the cantilever beam 118. In the preferred embodiment of the invention, the lower feedback electrode 132 is positioned generally perpendicular to and beneath the central region of the cantilever beam 118, as shown. Positioned on the lower feedback electrode 132 is a lower feedback electrode contact pad 134, which is used to supply a feedback voltage to the lower feedback electrode 132, as subsequently described.

Similarly, an upper feedback electrode 136 is positioned above the cantilever beam 118. The upper feedback electrode 136 is always positioned directly above and parallel to the lower feedback electrode 132. In the preferred embodiment of the invention, the upper feedback electrode 136, similarly to the lower feedback electrode 132, is generally perpendicular to and above the central region of the cantilever beam 118. The upper feedback electrode 136 bridges across the width of the cavity 112, and is secured to the base 110. Positioned on the upper feedback electrode 136, is an upper feedback electrode contact pad 138, which is used to supply a feedback voltage to the upper feedback electrode 136, as subsequently described.

Figure 2:
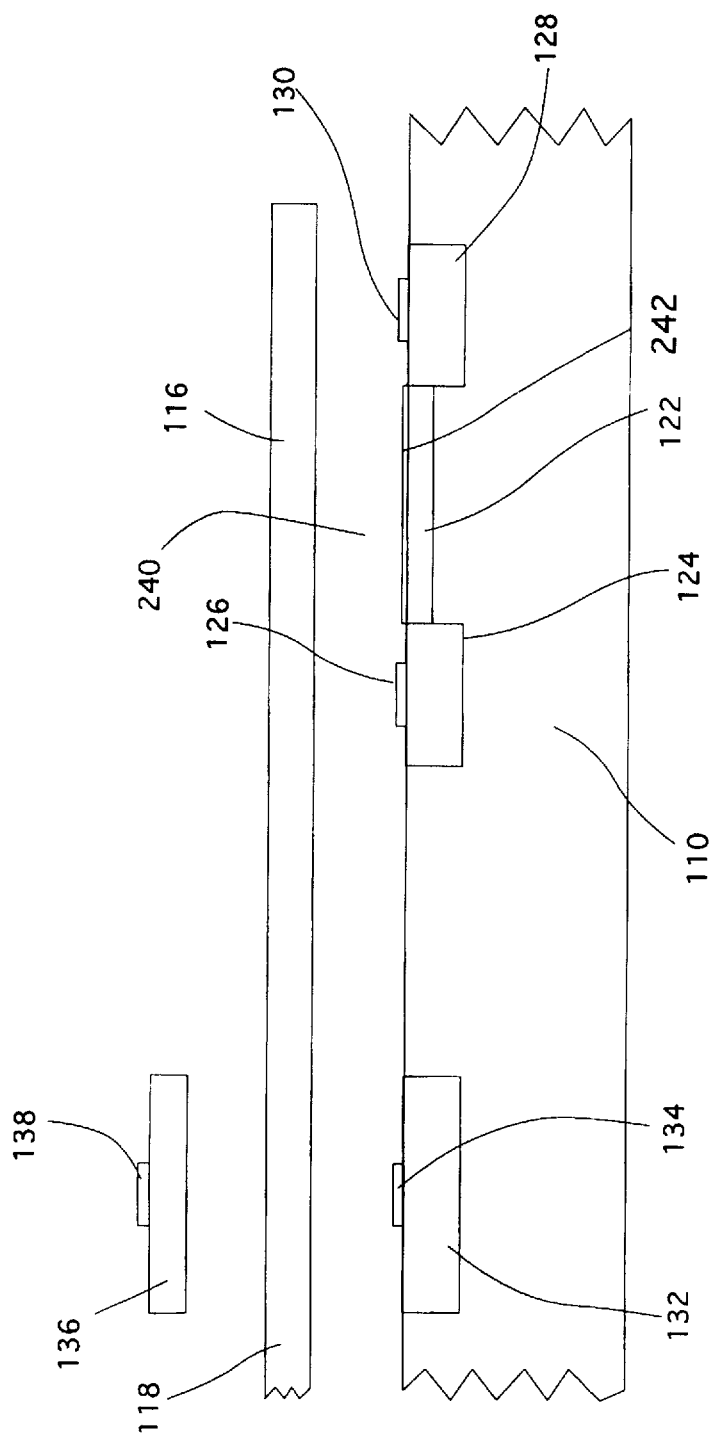
FIG. 2 is a cross-sectional side view detailing the area of the MGT and the electrode pair.

Referring to FIG. 2, the functional aspects of the sensor can be described as follows. An airgap 240 is defined as the clearance between the gate region 116 and the channel 122. As a voltage is applied to the gate region 116 of the cantilever beam 118 via the cantilever beam contact pad 120, charge accumulates in the channel 122 between the source implant 124 and the drain implant 128. At the operating bias voltage, inversion occurs in the channel 122, and current flows between the source implant 124 and the drain implant 128.

The bias voltages applied to the gate region 116 (via pad 120), the source implant 124 (via pad 126), and the drain implant 128 (via pad 130) are adjustable and are set to value that enable a good signal to noise ratio. The vibration of the cantilever beam, 118, modulates the current through the channel, 122. Therefore the measured current flow through the channel 122, relative to a reference current flow, corresponds to and varies with the increase and decrease in distance between the channel 122 and the gate region 116 of the cantilever beam 118. When the distance is decreased such that the channel 122 and the gate region 116 are closer together, the current flow through the channel increases. When the distance is increased such that the channel 122 and the gate region 116 are further apart, the current flow through the channel decreases. Over a period of time, the source-drain current will resemble the modulation of the conductivity of the channel 122, and therefore will represent the position of the cantilever beam 118 relative to the entire wideband vibration sensor.

A force balanced feedback control loop is then introduced that uses the positional information extracted from the source-drain current to dynamically restore the beam to its undeflected position. This mode of operation widens the dynamic range, provides a greater maximum signal range, and increases the sensitivity of the vibration sensor. A means of signal processing is located adjacent to the wideband vibration sensor with the control electronics. This feedback control loop provides a means of lossless dynamic damping to the system.

In particular, when the source-drain current is sensed to be lower than the reference value, which is indicative of an increased distance between the gate region 116 and the channel 122, the control loop will increase the voltage applied to the lower feedback electrode contact pad 134. The voltage applied to the lower feedback electrode 132 is enough to increase the electric field between the cantilever beam 118 and the lower feedback electrode 132, producing an electrostatic restoring acceleration which overrides any force in the opposite direction. Similarly, when the control loop senses and detects that the source-drain current is higher than the reference value, which is indicative of a decreased distance between the gate region 116 and the channel 122, the control loop will increase the voltage applied to the upper feedback electrode contact pad 138. This voltage applied to the upper feedback electrode 136 will increase the electric field between the cantilever beam 118 and the upper feedback electrode 136, to produce a restoring force attracting the cantilever beam 118 toward the upper electrode.

The position of the cantilever beam 118 relative to the channel surface can be described as function, f, of the source-drain current as follows:

$d = f(i_{sd})$

Therefore the velocity can be described as a function, g, of the derivative of the source-drain current with respect to time as follows:

$v = g(i_{sd}, di_{sd}/dt)$

Therefore the acceleration can be described as a function, h, of the second derivative of the source-drain current with respect to time squared as follows:

$a = h(i_{sd}, di_{sd}/dt, d^2i_{sd}/dt^2)$

In the preferred embodiment, referring to FIG. 2, the base 110 is made of single crystal silicon, and the cantilever beam 118 is made of polysilicon. On top of and completely covering the channel 122, is a thermally grown oxide layer 242.

In the preferred embodiment of the present invention, the transducer is an n-channel field effect device, meaning the channel 122 and the base 110 are primarily comprised of p-type silicon, while the source implant 124 and the drain implant 128 are primarily comprised of n-type silicon. Alternative embodiments of the present invention include the transducer being a p-channel field effect device, where the channel 122 and the base 110 are primarily comprised of n-type silicon, while the source implant 124 and the drain implant 128 are primarily comprised of p-type silicon.

For acceleration measurements, the disclosed wideband vibration sensor is precisely mounted in a standard packaging means such as a chip carrier. The preferred embodiment of the disclosed invention assumes hybrid packaging in which the control electronics are packaged in a separate but adjacent module of similar size considerations to the sensor package.

Alternative embodiments of the present invention include variations in the position and number of both the lower feedback electrode 132 and the upper feedback electrode 136. When the electrodes are generally perpendicular to the direction of the cantilever beam 118, it is possible to place them in locations above and below other areas than the central region of the cantilever beam 118. The repositioning of the electrode pair in this manner affects the voltage required to deflect or exert the balancing force on the cantilever beam 118. To achieve the same deflection of the cantilever beam 118, a higher voltage is needed if the electrode pair is placed in close proximity to the base of the cantilever beam 118, than if the electrode pair is placed closer to the free end (i.e. gate region 116) of the cantilever beam 118.

An additional alternative embodiment of the present invention includes multiple electrode pairs distributed along the length of the cantilever beam 118. Multiple electrode pairs distributed along the length of the beam would improve the controllability of the beam. Additional alternative embodiments of the present invention include aligning the sensing elements, i.e., the source implant 124, drain implant 128 and channel 122, with the extended direction of the cantilever beam 118. In other words, rotating these elements approximately 90 degrees from their position in the preferred embodiment of this invention. This rotation would allow for greater flexibility in the design of the transistor. The gain achieved by the transistor is related to the length of the channel, 122. A shorter channel allows for increased gain. In the current configuration, the length of the channel, 122 is limited by the width of the cantilever beam, 118. The alternative embodiment configuration presents greater opportunity to shorten the channel, 122, and thereby increase the gain of the transistor without sacrificing other parameters.

While only certain preferred features of the invention have been illustrated and described, many modifications, changes and substitutions will occur to those skilled in the art. It is, therefore, to be understood that the appended claims are intended to cover all such modifications and changes as fall within the true spirit of the invention.

We claim:

1. A wideband vibration sensor, comprising:
   a suspended mass further comprising a gate region proximate an area of large displacement amplitude of said suspended mass;
   a movable gate transistor further comprising a channel of said movable gate transistor; and
   a control module; wherein:
      vibrations to be detected alter a kinetic relationship between said gate region and said channel;
      the alteration of said kinetic relationship modulates a current flow through the transistor;
      the modulated current flow from the transistor is sensed using current flow sensing means, to deduce the kinetics of the suspended mass and hence of said vibrations; and
      based on the sensing of said modulated current flow, said control module controls the imposition of an opposing displacement force on said suspended mass by applying negative feedback control.

2. The sensor of claim 1, said transistor further comprising a source and a drain; wherein:
   a bias voltage is applied between said source and said drain; and
   said modulated flow is generated from said drain, by applying a bias voltage to said gate region such that vibratory perturbations of said gate region toward and away from said channel, cause the current flow to modulate high and low respectively.

3. The sensor of claim 1, further comprising at least one pair of feedback electrodes comprising an upper feedback electrode above and a lower feedback electrode below said suspended mass; wherein said opposing displacement force is imposed on said suspended mass by:
   lower voltage application means applying a voltage to the lower feedback control electrode to attract the suspended mass toward said channel, when said modulated current flow is sensed to reach a position of increased distance between said suspended mass and said channel; and
   upper voltage application means applying a voltage to the upper feedback control electrode to attract the suspended mass away from said channel, when said modulated current flow is sensed to reach a position of decreased distance between said suspended mass and said channel.

4. The sensor of claim 3, wherein said imposition of said opposing displacement force on said suspended mass by applying negative feedback control comprises imposition of force balanced feedback control, wherein the voltage applied to said upper feedback control electrode and said lower feedback control electrode are such that said suspended mass remains substantially stationary in an equilibrium position, thereby increasing the natural frequency of said suspended mass and enabling greater sensitivity and greater maximum signal range at high vibration frequencies.

5. The sensor of claim 4 wherein said suspended mass is a cantilever beam.

6. The sensor of claim 4, wherein said sensor is embodied in an integrated microchip unit.

7. The sensor of claim 3 wherein said suspended mass is a cantilever beam.

8. The sensor of claim 3, wherein said sensor is embodied in an integrated microchip unit.

9. The sensor of claim 1 wherein said suspended mass is a cantilever beam.

10. The sensor of claim 1, wherein the position d of the gate region of said suspended mass, relative to its unperturbed position, is deduced as a function, f, of the modulated current flow $i_{sd}$ at time t by the relationship $d=f(i_{sd}(t))$.

11. The sensor of claim 1, wherein the velocity v of the gate region of said suspended mass relative to its unperturbed velocity is deduced as a function, g, of the modulated current flow $i_{sd}$ with respect to time t by the relationship $v=g(i_{sd}, di_{sd}/dt)$.

12. The sensor of claim 1, wherein the acceleration a of the gate region of said suspended mass relative to its unperturbed acceleration is deduced as a function, h, of the modulated current flow $i_{sd}$ with respect to time t by the relationship $a=h(i_{sd}, di_{sd}/dt, d^2i_{sd}/dt^2)$.

13. The sensor of claim 1, wherein said imposition of said opposing displacement force on said suspended mass by applying negative feedback control comprises imposition of force balanced feedback control, thereby increasing the natural frequency of said suspended mass and enabling greater sensitivity and greater maximum signal range at high vibration frequencies.

14. The sensor of claim 13 wherein said suspended mass is a cantilever beam.

15. The sensor of claim 13, wherein said sensor is embodied in an integrated microchip unit.

16. The sensor of claim 1, wherein said sensor is embodied in an integrated microchip unit.

17. A method for sensing vibrations comprising:
   using said vibrations to alter a kinetic relationship between a gate region proximate an area of large displacement amplitude of a suspended mass and a channel of a movable gate transistor;
   modulating a current flow from the transistor based upon the alteration of said kinetic relationship;
   sensing the modulated current flow;
   deducing the kinetics of the suspended mass and hence of said vibrations from so-sensing said modulated current flow; and
   based on so-sensing said modulated current flow, using a control module to control the imposition of an opposing displacement force on said suspended mass by applying negative feedback control.

18. The method of claim 17, further comprising:
   applying a voltage drop between a source and a drain of said transistor; and
   generating said modulated current output from said drain, by applying a voltage bias to said gate region such that vibratory perturbations of said gate region toward and away from said channel, cause current flow to modulate high and low, respectively.

19. The method of claim 17, further comprising imposing said opposing displacement force on said suspended mass by:
  applying a voltage to a lower feedback electrode of at least one electrode pair, thereby attracting the suspended mass toward said channel, when said modulated current flow reaches a position of increased distance between said suspended mass and said channel; and
  applying a voltage to an upper feedback electrode of said at least one electrode pair to attract the suspended mass away from said base channel, when said modulated current output reaches a position of decreased distance between said suspended mass and said channel.

20. The method of claim 19, wherein controlling said imposition of said opposing displacement force on said suspended mass by applying negative feedback control with a control module comprises controlling an imposition of force balanced feedback control by applying voltages to said upper feedback control electrode and said lower feedback control electrode such that said suspended mass remains substantially stationary in an equilibrium position, thereby increasing the natural frequency of said suspended mass and enabling greater sensitivity and greater maximum signal range at high vibration frequencies.

21. The method of claim 20, wherein said suspended mass is a cantilever beam.

22. The method of claim 20, further comprising embodying said sensor in an integrated microchip unit.

23. The method of claim 19, wherein said suspended mass is a cantilever beam.

24. The method of claim 19, further comprising embodying said sensor in an integrated microchip unit.

25. The method of claim 17, wherein said suspended mass is a cantilever beam.

26. The method of claim 17, further comprising deducing the position d of the gate region of said suspended mass relative to its unperturbed position as a function, f, of the modulated current flow $i_{sd}$ at time t by the relationship $d=f(i_{sd}(t))$.

27. The method of claim 17, further comprising deducing the velocity v of the gate region of said suspended mass relative to its unperturbed velocity as a function, g, of the modulated current flow $i_{sd}$ with respect to time t by the relationship $v=g(i_{sd}, di_{sd}/dt)$.

28. The method of claim 17, further comprising deducing the acceleration of the gate region of said suspended mass relative to its unperturbed acceleration as a function, h, of the modulated current flow $i_{sd}$ with respect to time t by the relationship $a=h(i_{sd}, di_{sd}/dt, d^2i_{sd}/dt^2)$.

29. The method of claim 17, wherein controlling said imposition of said opposing displacement force on said suspended mass by applying negative feedback control with a control module comprises controlling an imposition of force balanced feedback control, thereby increasing the natural frequency of said suspended mass and enabling greater sensitivity and greater maximum signal range at high vibration frequencies.

30. The method of claim 29, wherein said suspended mass is a cantilever beam.

31. The method of claim 29, further comprising embodying said sensor in an integrated microchip unit.

32. The method of claim 17, further comprising embodying said sensor in an integrated microchip unit.

33. A method for increasing the high-frequency sensitivity and maximum signal range of an electro-mechanical vibration sensor, comprising:
  controlling the imposition of an opposing displacement force on a suspended mass used as a mechanical vibration sensing element in said sensor, using a control module applying negative feedback control, based on sensing the vibration of the mass.

34. The method of claim 33, further comprising so-imposing said opposing displacement force on said suspended mass by applying voltages to upper and lower feedback electrodes of at least one electrode pair.

* * * * *